United States Patent
Nakamura et al.

(10) Patent No.: US 7,156,543 B2
(45) Date of Patent: Jan. 2, 2007

(54) VEHICLE LAMP

(75) Inventors: Koichi Nakamura, Shizuoka (JP); Hiroshi Muramatsu, Shizuoka (JP); Junji Toki, Shizuoka (JP); Masaru Takiguchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 91 days.

(21) Appl. No.: 10/880,457

(22) Filed: Jul. 1, 2004

(65) Prior Publication Data
US 2005/0002196 A1  Jan. 6, 2005

(30) Foreign Application Priority Data
Jul. 2, 2003  (JP) ............... P. 2003-190254

(51) Int. Cl.
*B60Q 1/00* (2006.01)
(52) U.S. Cl. ............... 362/507; 362/341; 362/516
(58) Field of Classification Search ............ 362/341, 362/507, 509, 516, 11; 359/883
See application file for complete search history.

(56) References Cited

U.S. PATENT DOCUMENTS

| 3,607,584 A | * | 9/1971 | Becht ................... 359/883 |
| 3,681,180 A | * | 8/1972 | Kent .................... 428/189 |
| 4,347,554 A | * | 8/1982 | Matsushita ............. 362/297 |
| 4,563,730 A | * | 1/1986 | Saito ................... 362/516 |
| 4,703,401 A | * | 10/1987 | Ichihara et al. ......... 362/517 |
| 4,837,668 A | * | 6/1989 | Koehler ................. 362/297 |
| 5,010,458 A | * | 4/1991 | Fraizer ................. 362/516 |
| 5,130,904 A | * | 7/1992 | Ohshio et al. ........... 362/516 |
| 6,190,028 B1 | * | 2/2001 | Aikawa et al. .......... 362/510 |
| 6,472,458 B1 | * | 10/2002 | Yoshimoto et al. ....... 524/425 |

FOREIGN PATENT DOCUMENTS

| JP | 60-94705 U | 6/1985 |
| JP | 2000-280288 A | 10/2000 |

* cited by examiner

*Primary Examiner*—Renee Luebke
*Assistant Examiner*—Gunyoung T. Lee
(74) *Attorney, Agent, or Firm*—Sughrue Mion, PLLC

(57) ABSTRACT

A vehicle lamp 10 comprises a light source portion 50 and a plastic decorative member 60 in a lamp chamber 40 constituted by a body 20 and a lamp cover 30 for covering the front of the body. The decorative member has a skin layer 64 and a core layer 65 which are formed by sandwich molding; and the core layer is located in at least a portion that requires heat-resistance in the decorative member and formed of resin material greater in heat-resistance than resin material for the skin layer.

17 Claims, 5 Drawing Sheets

VEHICLE LAMP

BACKGROUND OF THE INVENTION

The present invention relates to a novel vehicle lamp and more particularly to the art of forming a portion that requires heat-resistance less costly in a good external appearance.

Many component parts of vehicle lamps, for example, automotive lamps are formed of resin material and some component parts require heat-resistance. For example, quite a high temperature is present in the vicinity of a light source portion such as a light source bulb, so that the component part used in the vicinity of the light source portion requires heat-resistance.

In case that material having poor heat-resistance is used for the portion that requires heat-resistance as in the vicinity of the light source portion, a problem of thermal deterioration occurs.

Even though highly heat-resistant resin material is used as the material for some component part to be used in a portion that requires heat-resistance, the problem is that the vehicle lamp tends to become costly because resin material having great heat-resistance is expensive.

Moreover, highly heat-resistant resin material is poor in process ability and difficult to take out a fine detail and to planish. The surfaces of component parts for use in the vehicle lamp are often subjected to vapor deposition. Even though the deposition is applied to the surface, no fine deposited plane is obtained after the deposition unless the surface is planished. Therefore, an under coating layer is given to the surface where the deposition is performed to make the surface a smooth plane and then the deposition is applied onto the under coating layer. Consequently, the process step of forming the under coating layer is required and material for the under coating layer becomes additionally needed, which also causes an increase in the cost of the vehicle lamp. Further, highly heat-resistant resin material is poor in fluidity and this results in increasing the thickness, so that not only the weight of the component part but also the material cost is increased further.

Meanwhile, JP-U-60-094705 describes the art of forming highly heat-resistant resin material by monolithic molding in the portion located right above a light source bulb as a light source out of a lamp body.

In the art indicated in JP-U-60-094705, highly heat-resistant resin material is used for only part of the component part (lamp body) and the advantage is that the amount of the expensive heat-resistant resin material used is reducible.

According to the art described in JP-U-60-094705, the portion formed of the heat-resistant resin material is located on the surface of the lamp body. Therefore, the surface of the portion formed of the heat-resistant resin material becomes poor in formability, whereupon the formation of an under coating layer becomes essential in performing vapor deposition.

As the surface of the portion formed of the heat-resistant resin material is exposed to the outside, a seam line is produced between the portion formed of the heat-resistant resin material and the portion formed of resin material other than the heat-resistant resin material; the problem is that the external appearance is spoiled. When such a line is produced once, it stands out on the deposited plane even when the deposition is applied thereto and the external appearance is never improved.

SUMMARY OF THE INVENTION

An object of the invention made in view of the situation above is to form a portion that requires heat-resistance less costly in a good external appearance.

In order to accomplish the object above, a vehicle lamp according to the invention, comprises a light source portion and a plastic decorative member in a lamp chamber constituted by a body and a lamp cover for covering the front of the body, wherein the decorative member has a skin layer and a core layer which are formed by sandwich molding; and the core layer is located in at least a portion that requires heat-resistance in the decorative member and formed of resin material greater in heat-resistance than resin material for the skin layer.

Therefore, highly heat-resistant resin material is used for at least part of the component part and the highly heat-resistant resin material never exposes itself on the surface of the decorative member.

DESCRIPTION OF THE PREFERRED EMBODIMENTS

Vehicle lamps embodying the invention will now be described by reference to the drawings.

<First Embodiment>

Figure 1:
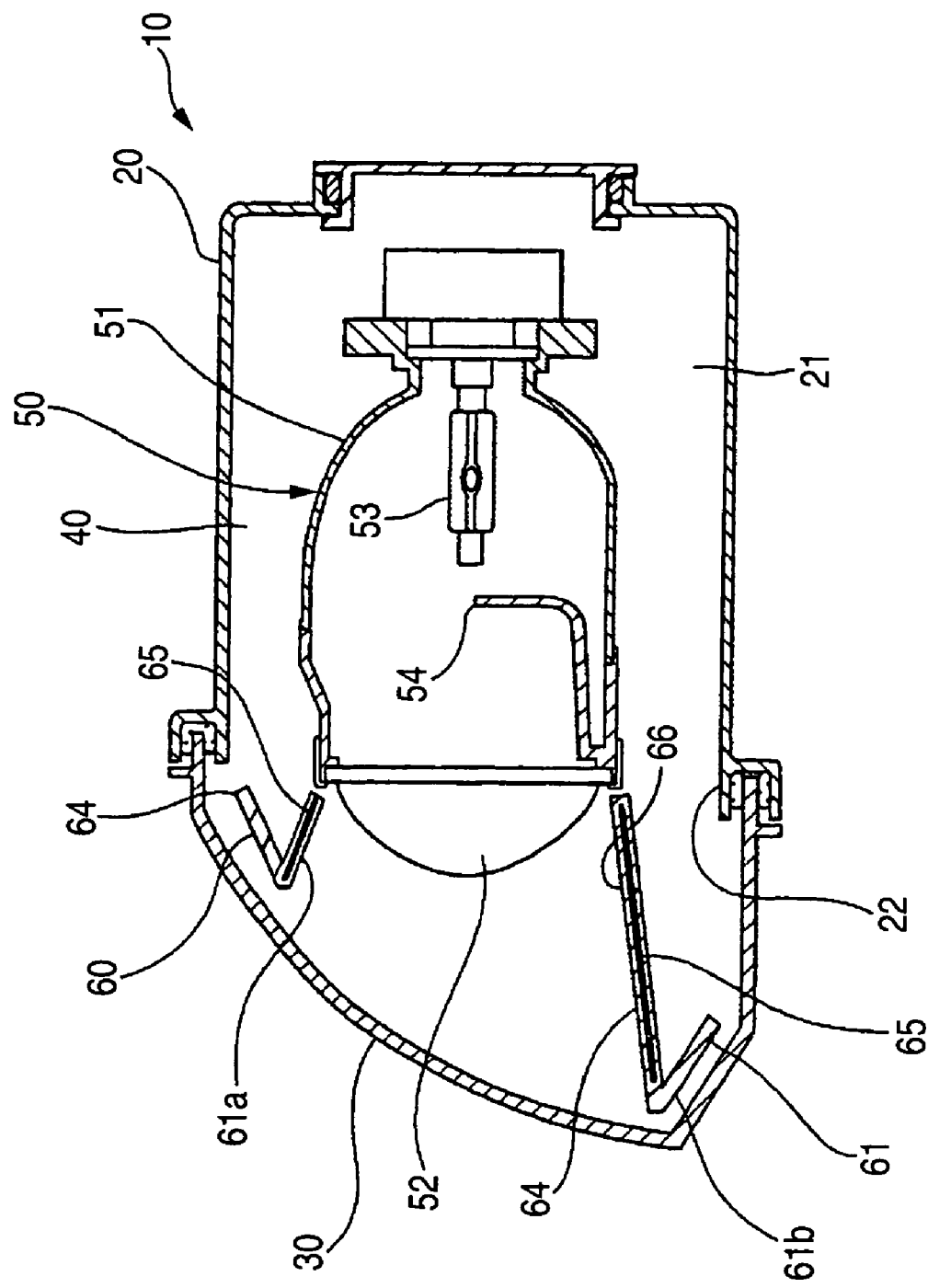
FIG. 1 is a vertical sectional view showing a vehicle lamp according to a first embodiment of the invention.
Figure 2:
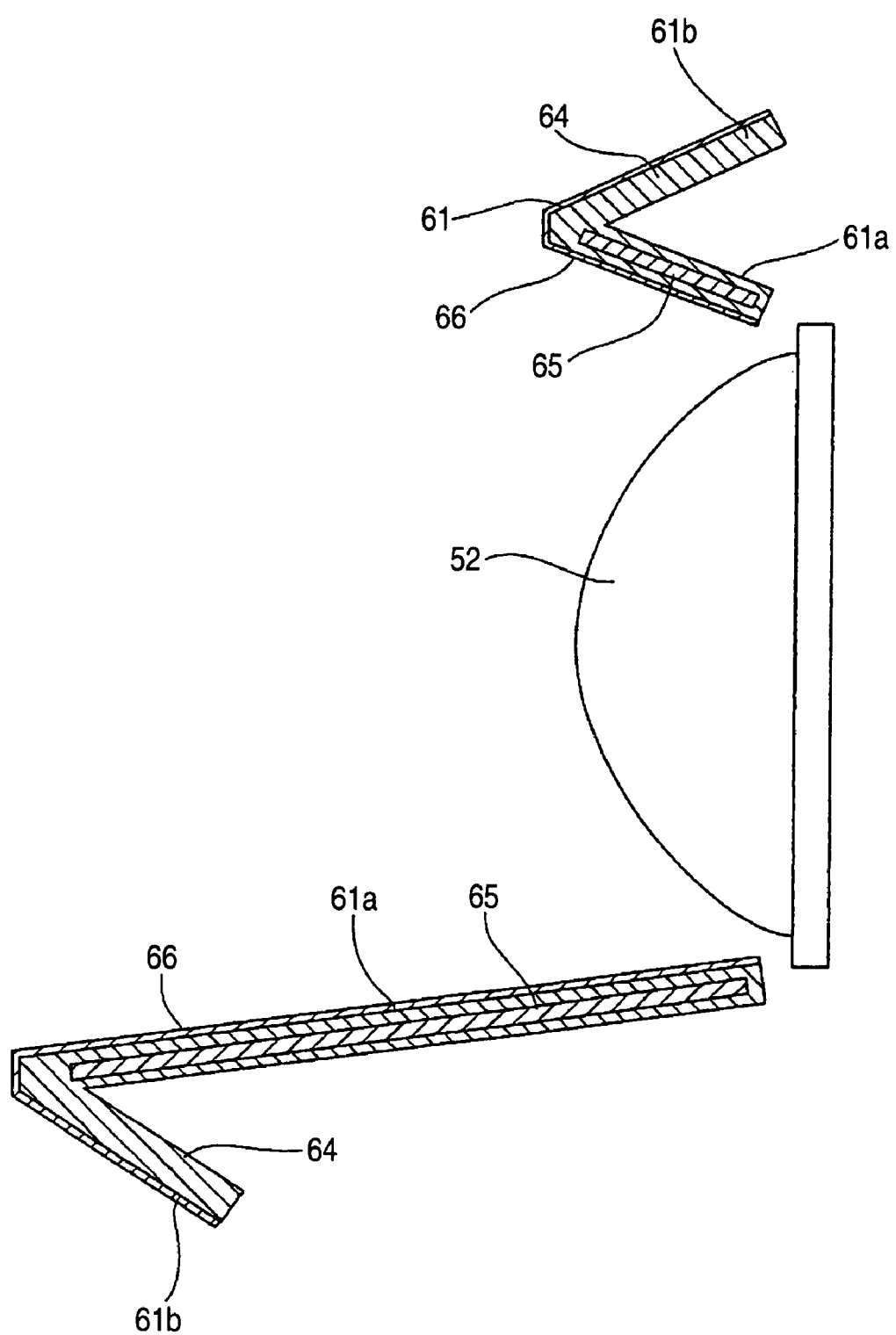
FIG. 2 is an enlarge view of the principal part of FIG. 1.
Figure 3:
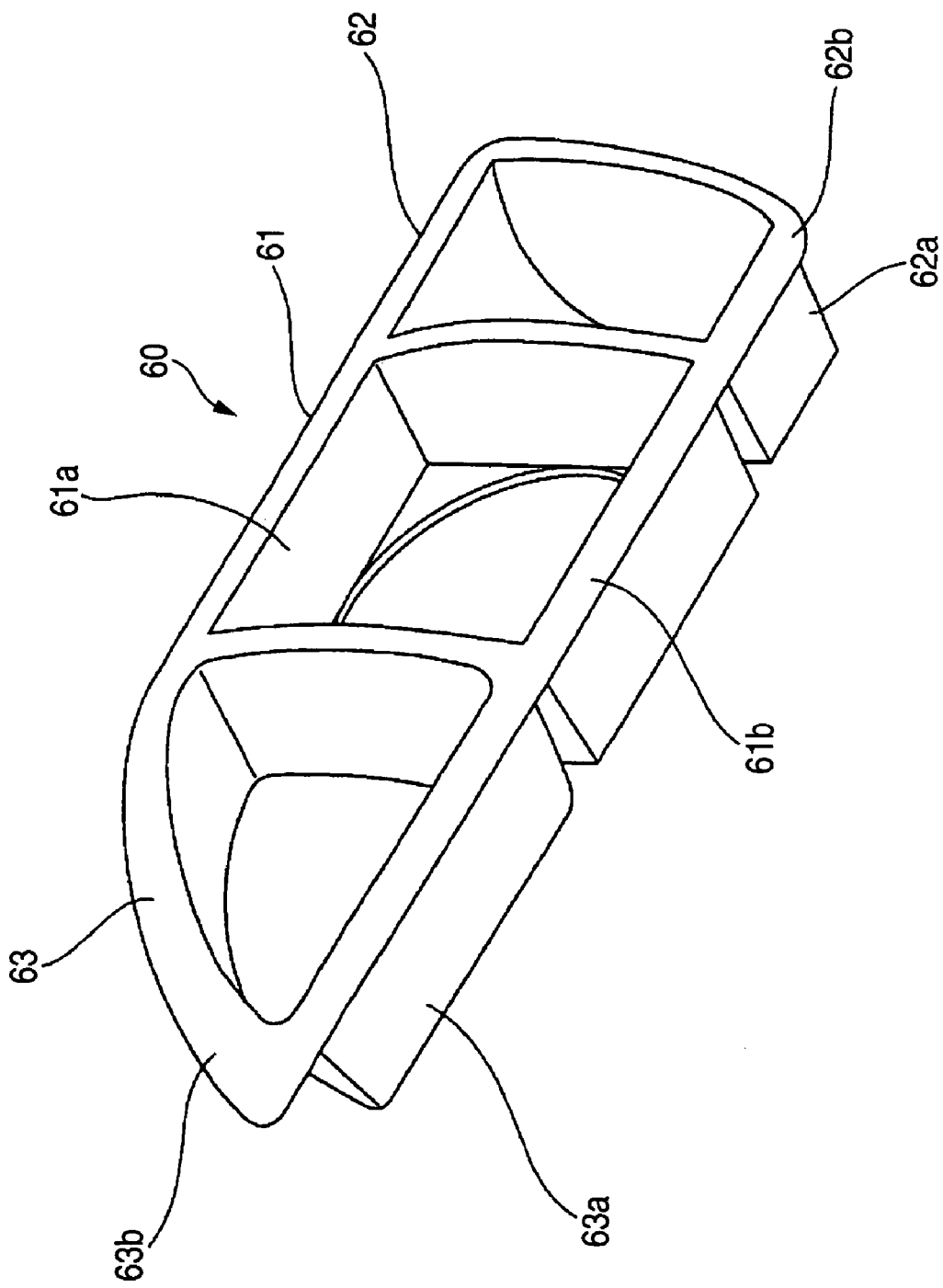
FIG. 3 is a schematic perspective view of a decorative member of the first embodiment.

FIGS. 1 to 3 show a vehicle lamp as a first embodiment of the invention.

A vehicle lamp 10 is a projector type head lamp in which the front opening 22 of a lamp body 20 having a hollow portion 21 opening in front is covered with a lamp cover 30 to form a lamp chamber 40 in a partitioned condition.

A beam projection unit 50 is disposed in the lamp chamber 40. The beam projection unit 50 is used for projecting beams forward, the beams having a desired luminous distribution pattern, the beam projection unit 50 forming one light source portion. The beam projection unit 50 comprises a reflector 51 for gathering reflected light and directing it to a condensing position, a convex lamp cover 52 for projecting the light gathered by the reflector 51 forward and a shading member 54 for restricting the configuration of the luminous distribution pattern formed by the light projected forward by the convex lamp cover 52, particularly restricting a boundary between light and shade on the upper side. The beam projection unit 50 is tiltably supported on the lamp body 20 by a support mechanism (not shown).

Further, the vehicle head lamp 10 is provided with two other beam projection units (not shown) in addition to the beam projection unit 50.

An extension 60 as a decorative member is positioned so as to cover the section between the peripheral portion of the convex lamp cover 52 up to the opening 22 of the lamp body 20. As seen from FIG. 3, the extension 60 is formed integrally with portions 62 and 63 for covering the section between the front end portions of the two other beam projection units (not shown) and the opening 22, in addition to a portion 61 for covering the section between the front end portion of the beam projection unit 50 and the opening 22 of the lamp body 20, these portions 61, 62 and 63 being substantially in the form of a frame.

The portions 61, 62 and 63 of the extension 60 are formed integrally with inner parts 61a, 62a and 63a slightly expanding forward from their rear ends as well as extending forward and with folded-back parts 61b, 62b and 63b slightly folded back from the front ends of the inner parts 61a, 62a and 63a outside.

As seen from FIG. 2, the extension 60 is formed with a skin layer 64 located on the outer surface side and a core layer 65 located inside. The illustration of skin layers 64 and core layers 65 in the respective portions 62 and 63 will be omitted. The core layer 65 is formed from a portion a little to the rear end up to what is a little to the front end of the inner part 61a. The folded-back part 61b is formed with only the skin layer 64.

The core layer 65 is formed of resin material greater in heat-resistance than the resin material of the skin layer 64. Although the skin layer 64 is not so highly heat-resistant, it is superior in fluidity and excellent in formability and besides formed of resin material offering a good external appearance. As the resin material for the core layer 65, high heat PC (polycarbonate) and PBT (polybutylene terephthalate)/PET (polyethylene terephthalate), for example, are fit for use; however, resin materials are needless to say not limited to those enumerated by way of example. As the resin material for the skin layer 64, moreover, PC (polycarbonate), for example, is fit for use; however, resin material other than PC may needless to say be usable.

The extension 60 can be formed by so-called sandwich molding. The sandwich molding refers to a molding method according to which different resin materials are used to mold the core material (core layer) and the surface material (skin layer) for covering the core material. Since the disclosure in JP-A-2000-280288, many reports have been made on mold and molding technologies for effectively implementing the sandwich molding.

In the vehicle lamp 10, the periphery of the convex lamp cover 52 of the beam projection unit 50 is exposed to a quite high temperature, for example, 130° C. or higher. In case that material having poor heat-resistance is used for the inner part 61a of the extension 60, the inside of the inner part 61a is filled with heat with gas generated therein, which results in causing deformation due to the deterioration of the inside thereof, and may be damaged in an extreme instance. As the inside of the inner part 61a is formed with the core layer 65 made of highly heat-resistant resin material according to the invention, the generation of gas is obviated even though the inside thereof is exposed to a high temperature, so that its deterioration and damage are prevented.

Since the inside of the portion (inner part 61a and the like) of the extension 60 exposed to a high temperature is formed with the core layer 65 made of highly heat-resistant resin material as described above, resin material offering excellent formability and a good external appearance, though it is poor in heat-resistance, can be used for the skin layer 64 forming the outer surface. Therefore, the surface of the extension 60 can be planished and a metallic vapor-deposited layer 66 is directly formable on the surface of the extension 60 without providing the under coating layer.

Since highly heat-resistant resin material is used for the core layer 65 molded by sandwich molding for the inner part 61a as the portion that requires the heat-resistance in the extension 60 as the decorative member in the vehicle lamp 10, resin material offering excellent fluidity and a good external appearance though it is poor in heat-resistance is usable for the skin layer 64. Consequently, a thin lightweight extension 60 can be formed at low cost.

As the surface of the skin layer 64 can be planished, moreover, the metallic vapor-deposited layer is directly formable without forming the under coating layer on the surface of the extension 60, whereby it is possible to bring about a reduction in costs through a simplified manufacturing process.

As a boundary between resin materials different in heat-resistance does not appear on the exterior surface, the external appearance is improved.

<Second Embodiment>

Figure 4:
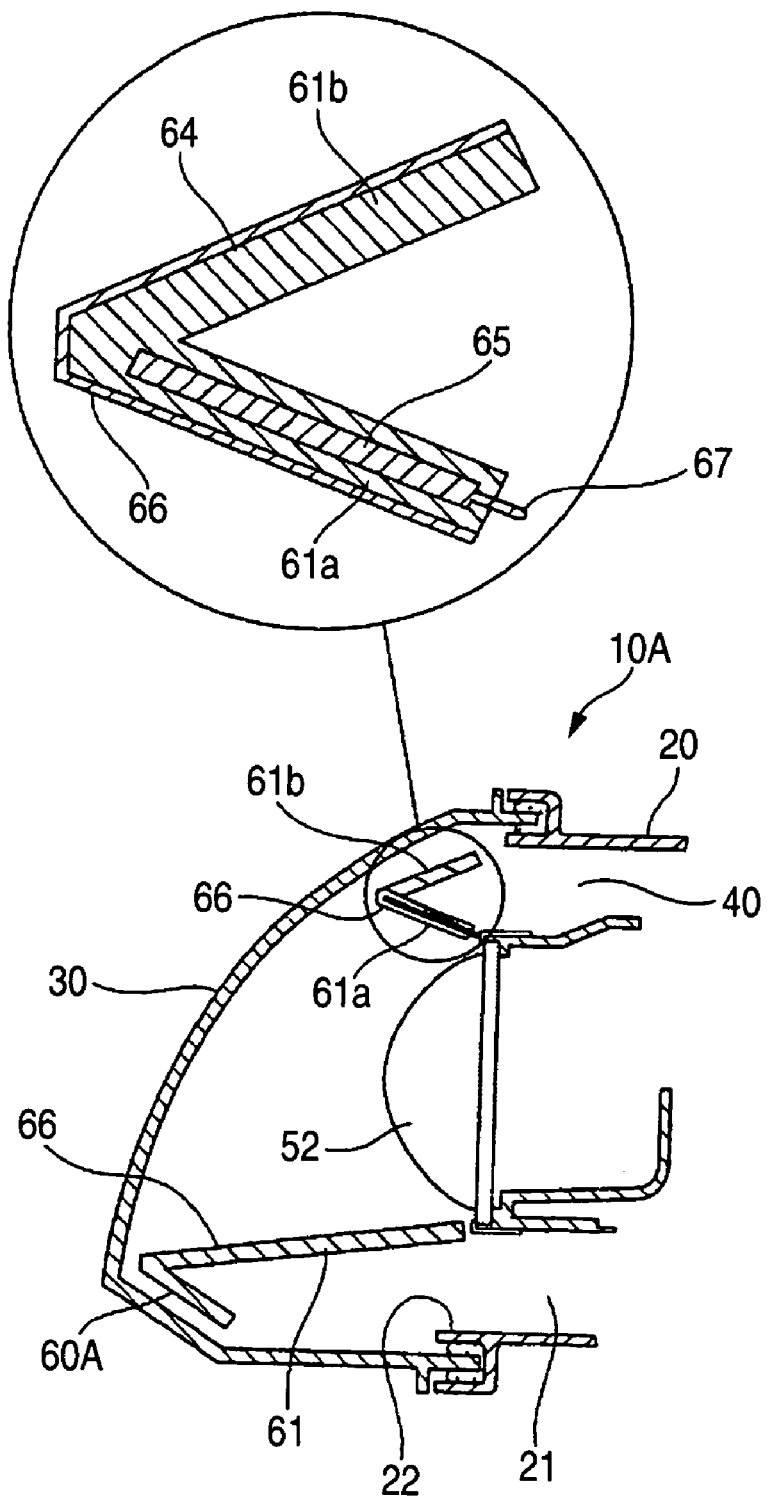
FIG. 4 is a vertical sectional view showing the principal part of a vehicle lamp according to a second embodiment of the invention.
Figure 5:
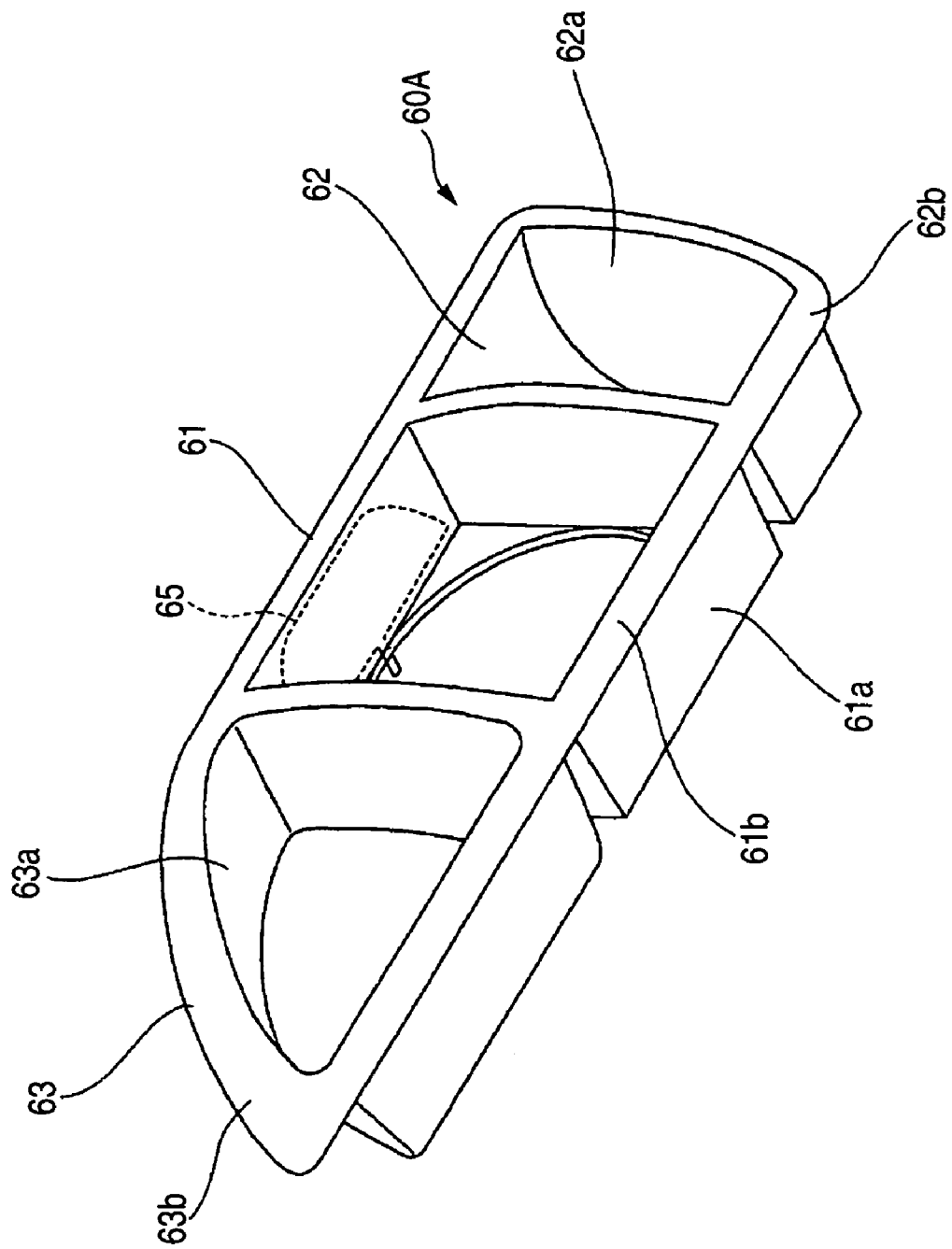
FIG. 5 is a schematic perspective view of a decorative member of the second embodiment.

FIGS. 4 and 5 show a vehicle lamp according to a second embodiment of the invention.

On comparison between an automotive head lamp 10A according to the second embodiment of the invention and the vehicle lamp 10 according to the first embodiment thereof, it becomes clear that the difference therebetween lies in only the place where the core layer of the extension is formed and the rest of the arrangement is similar to the arrangement according to the first embodiment thereof; therefore, only the difference will be described in detail and like component parts according to the second embodiment thereof are given like reference characters according to the first embodiment thereof and the description of it will be omitted.

The periphery of the convex lamp cover 52 of the beam projection unit 50 is exposed to a high temperature and what is especially exposed to such a high temperature is the upper portion of the convex lamp cover 52. Accordingly, there may be a case where the core layer 65 need not be formed over the whole inner part 61a (though 62a and 63a are in a similar situation, illustration of them will be omitted) of an extension 60A. In a case like this, it is useless to form a core layer formed of highly heat-resistant resin material in a portion that does not require great heat-resistance because the highly heat-resistant resin material is expensive.

Therefore, the core layer 65 is formed in only the portion positioned in the upper section of the convex lamp cover 52 of the beam projection unit 50 out of the inner part 61a of the extension 60A.

The formation of the core layer 65 is made possible by forming, for example, the gate of the core layer 65, in addition to the gate of the skin layer 64, correspondingly at the rear end of the cavity of the inner part 61a that requires the core layer 65; and at the time the injection of resin material for the skin layer 64 proceeds to a certain extent, for example, 60–90%, the injection of the resin material for the core layer 65 is started. Consequently, a trace 67 of the gate of the core layer 65 is formed at the rear end of the inner part 61a and in a hidden portion from the outside, that is, formed in a place visually unrecognizable.

The method of forming the core layer 65 according to the second embodiment of the invention is needless to say not limited to such a method as described above.

According to the second embodiment of the invention, the amount of expensive highly heat-resistant resin material used can be saved since the core layer 65 is formed in only the portion that requires the core layer 65, so that the vehicle head lamp 10A can be formed less costly.

Although the extension has been designated as a decorative member according to the above embodiments of the invention, any other member than the extension is included in such a decorative member on condition that it carries the connotation of "decorative." As the reflector, for example, carries the implication of a decorative part," it is included in the decorative member according to the invention.

The configuration and structure of each specific component part in the above embodiments of the invention are only shown by way of example when the invention is implemented and it should be understood that the technical scope of the invention is not to be restrictively interpreted.

Obviously, as set forth above, the vehicle lamp according to the invention comprises a light source portion and a plastic decorative member in a lamp chamber constituted by a body and a lamp cover for covering the front of the body, wherein the decorative member has a skin layer and a core layer which are formed by sandwich molding; and the core layer is located in at least a portion that requires heat-resistance in the decorative member and formed of resin material greater in heat-resistance than resin material for the skin layer.

Therefore, the highly heat-resistant resin material is used for at least part of the component part and the highly heat-resistant resin material never exposes itself on the surface of the decorative member. Consequently, poor heat-resistant resin material can be used for the skin layer that defines the external appearance of the decorative member, so that a slim lightweight decorative member can be formed less costly.

As a boundary between resin materials different in heat-resistance does not appear on the exterior surface, the external appearance is improved.

According to the invention, as the skin layer is formed of resin material offering a good external appearance, the external appearance of the decorative member is improved.

According to the invention, as the metallic vapor-deposited layer is directly formed on the surface of the skin layer, the under coating layer need not be formed on the skin layer at the preceding step of providing the metallic vapor-deposited layer, so that the manufacturing process is simplified.

According to the invention, as the core layer is formed in the portion that requires heat-resistance, the amount of the expensive heat-resistant resin material used is reducible, which contributes to further reduction in costs.

According to the invention, as the gate mark of the core layer is formed in a hidden portion from the outside, the gate mark of the core layer never spoils the good outward appearance of the vehicle lamp.

What is claimed is:

1. A vehicle lamp comprising a lamp chamber and a plastic decorative member arranged in the lamp chamber,
    wherein the plastic decorative member includes a portion having skin layers and a core layer which are formed by sandwich molding, and
    wherein the core layer is formed of resin material greater in heat-resistance than resin material for the skin layers,
    wherein the skin layers comprise a first skin layer and a second skin layer,
    wherein the first skin layer and the second skin layer are formed of a same material,
    wherein the first skin layer is directly formed on an obverse surface of the core layer,
    wherein the second skin layer is directly formed on a reverse surface of the core layer, and
    wherein a metallic vapor-deposited layer is directly formed on a surface of the first skin layer.

2. The vehicle lamp according to claim 1, wherein the plastic decorative member further includes a portion that does not have a core layer and has skin layers.

3. The vehicle lamp according to claim 1, wherein the core layer is made of at least one of high heat polycarbonate, polybutylene terephthalate and polyethylene terephthalate.

4. The vehicle lamp according to claim 1, wherein the skin layers are made of polycarbonate.

5. The vehicle lamp according to claim 1, wherein the plastic decorative member comprises an extension.

6. The vehicle lamp according to claim 1, wherein the plastic decorative member comprises a reflector.

7. A vehicle lamp comprising:
    a body;
    a lamp cover for covering the front of the body;
    a lamp chamber constituted by the body and the lamp cover;
    a light source portion; and
    a plastic decorative member, arranged in the lamp chamber, including skin layers and a core layer which are formed by sandwich molding,
    wherein the core layer is located in at least a portion that requires heat-resistance in the decorative member and formed of resin material greater in heat-resistance than resin material for the skin layers,
    wherein the skin layers comprise a first skin layer and a second skin layer,
    wherein the first skin layer and the second skin layer are formed of a same material,
    wherein the first skin layer is directly formed on an obverse surface of the core layer,
    wherein the second skin layer is directly formed on a reverse surface of the core layer, and
    wherein a metallic vapor-deposited layer is directly formed on a surface of the first skin layer.

8. The vehicle lamp according to claim 7, wherein the skin layers are formed of resin material offering a good external appearance.

9. The vehicle lamp according to claim 7, wherein the core layer is formed only in a portion that requires heat-resistance.

10. The vehicle lamp according to claim 9, wherein a gate mark of the core layer is formed in a hidden portion from the outside.

11. The vehicle lamp according to claim 7, wherein the core layer is made of at least one of high heat polycarbonate, polybutylene terephthalate and polyethylene terephthalate.

12. The vehicle lamp according to claim 7, wherein the skin layers are made of polycarbonate.

13. The vehicle lamp according to claim 7, wherein the plastic decorative member comprises an extension.

14. The vehicle lamp according to claim 7, wherein the plastic decorative member comprises a reflector.

15. The vehicle lamp according to claim 7, wherein the plastic decorative member is configured such that a boundary between resin materials that have different heat resistances does not appear on an exterior surface of the plastic decorative member.

16. The vehicle lamp according to claim 7, wherein the core layer is configured such that the core layer it exhibits no substantial thermal deterioration at a temperature of 130° C.

17. The vehicle lamp according to claim 7, wherein the plastic decorative member is arranged inside the lamp cover and outside a convex lamp cover.

* * * * *